United States Patent [19]

Linton et al.

[11] Patent Number: 4,924,777
[45] Date of Patent: May 15, 1990

[54] MAXIMUM DENSITY CONVEYOR SYSTEM

[75] Inventors: Leon Linton; Michael L. Campbell, both of Memphis, Tenn.

[73] Assignee: Southern Systems, Inc., Memphis, Tenn.

[21] Appl. No.: 271,713

[22] Filed: Nov. 16, 1988

[51] Int. Cl.⁵ .............................................. B65G 17/00
[52] U.S. Cl. ................................ 104/172.2; 198/465.1
[58] Field of Search .................... 198/1, 465.1, 803.1; 104/172.2, 172.3

[56] References Cited

U.S. PATENT DOCUMENTS

| | | | |
|---|---|---|---|
| 2,844,241 | 7/1958 | King | 104/172.3 X |
| 3,410,225 | 11/1968 | Saunders | 104/172.3 |
| 3,661,094 | 5/1972 | Pachuta | 104/172.3 |
| 3,912,072 | 10/1975 | Kornylak | 104/172.3 X |
| 4,474,286 | 10/1984 | Alexander | 198/802 |

OTHER PUBLICATIONS

"Tow Cart Assy", (M-86-257-E Job Number), Southern Systems Inc., & X-Section Job Number M 85-753-E.

*Primary Examiner*—Andres Kashnikow
*Assistant Examiner*—Kevin P. Weldon
*Attorney, Agent, or Firm*—Walker & McKenzie

[57] ABSTRACT

A conveyor system in which carriers are normally towed along the center line by pushers on a power chain that engage center tow pins along the center line of the carriers but which are disengaged from the center tow pins prior to a turn to the right or left to provide a power released carrier. Then the pushers subsequently engage side tow pins along the side of the carrier towards which the turn is to be made to move the carrier around the turn. A positioning take-up device for the power chain is provided to vary the spacing between the carriers by varying the point of engagement of the pushers with the side tow pins.

8 Claims, 2 Drawing Sheets

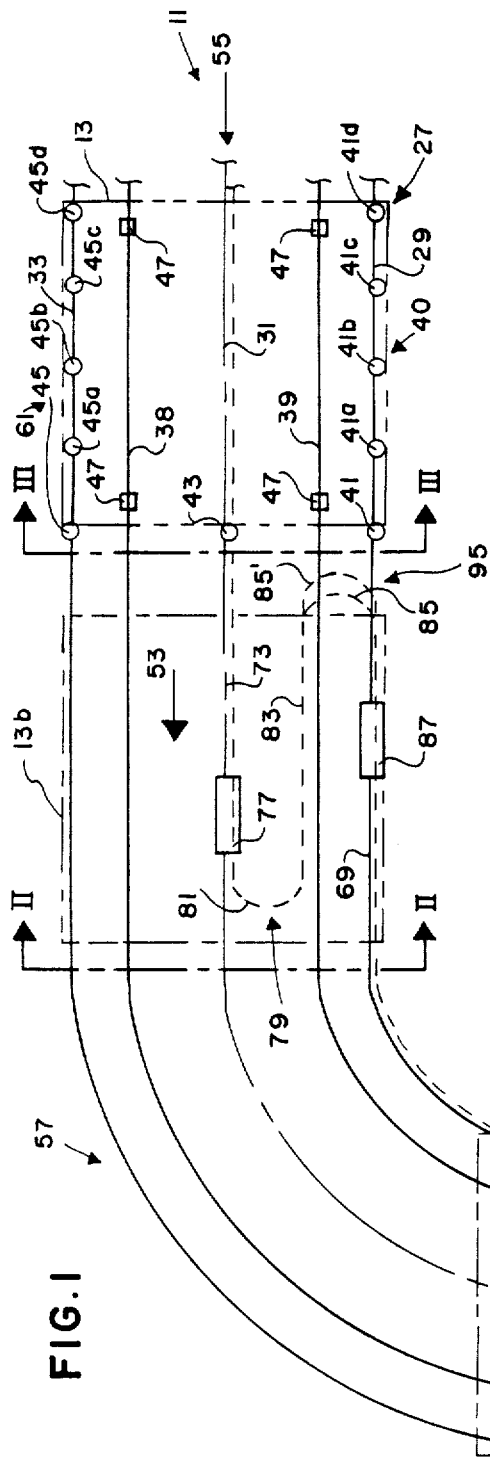
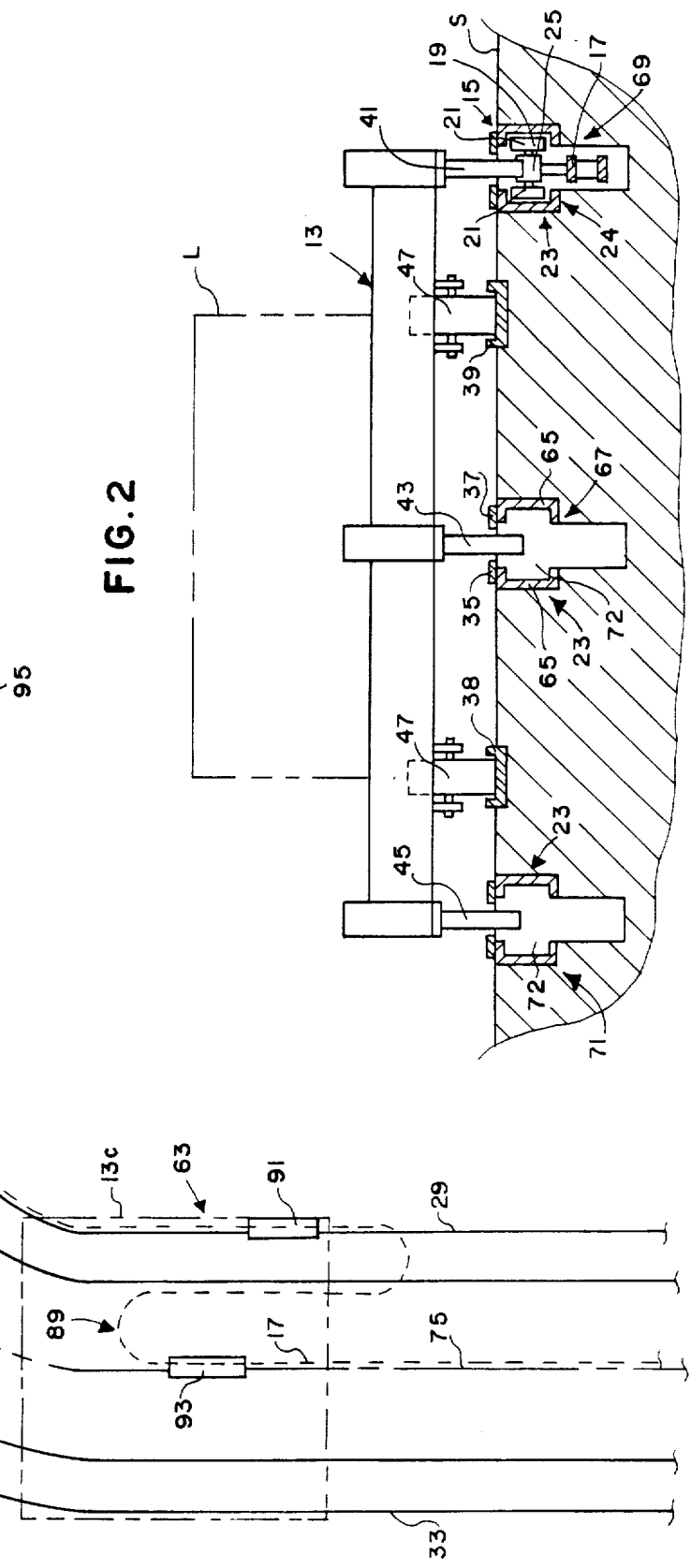
FIG.1
FIG.2

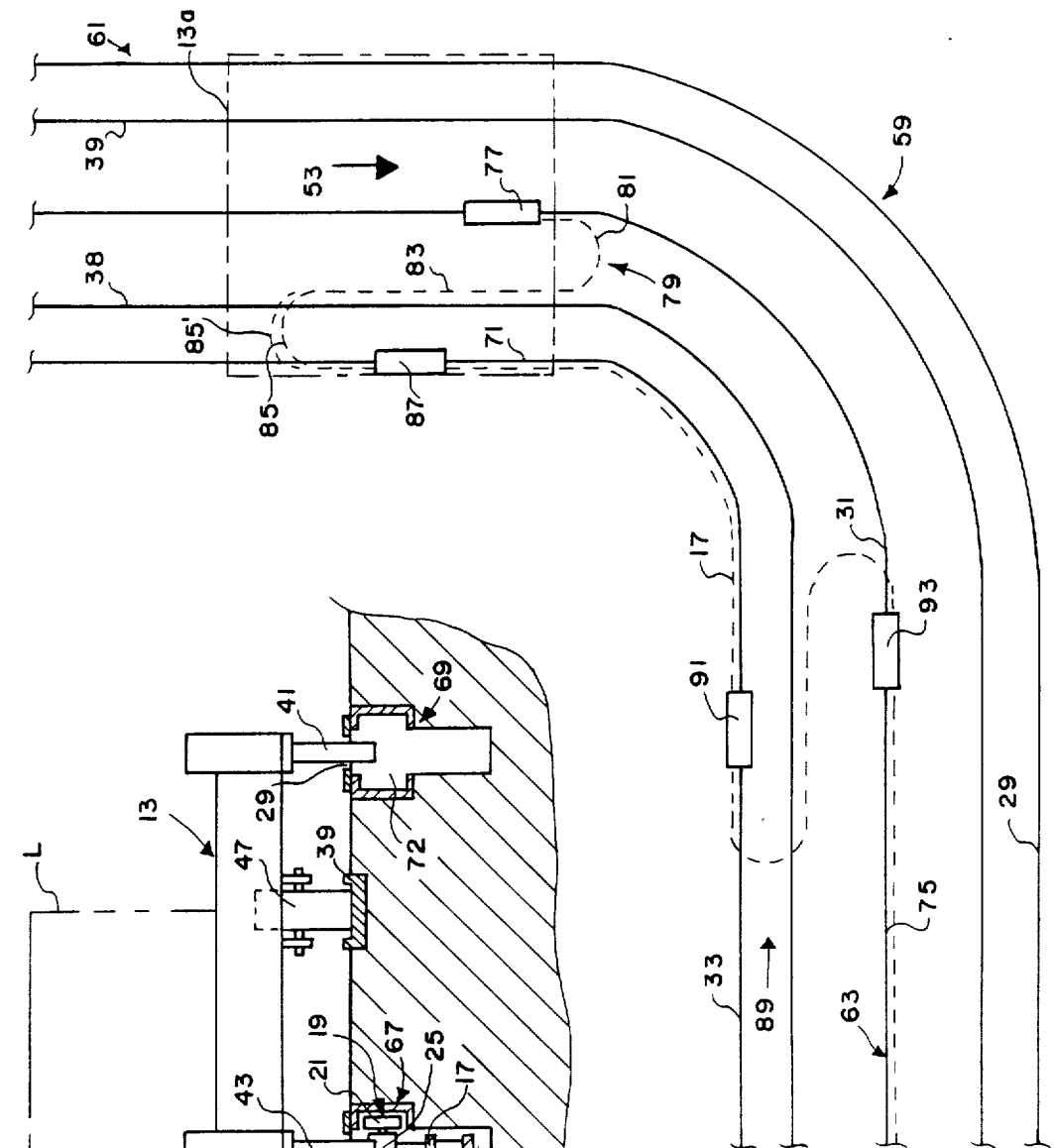
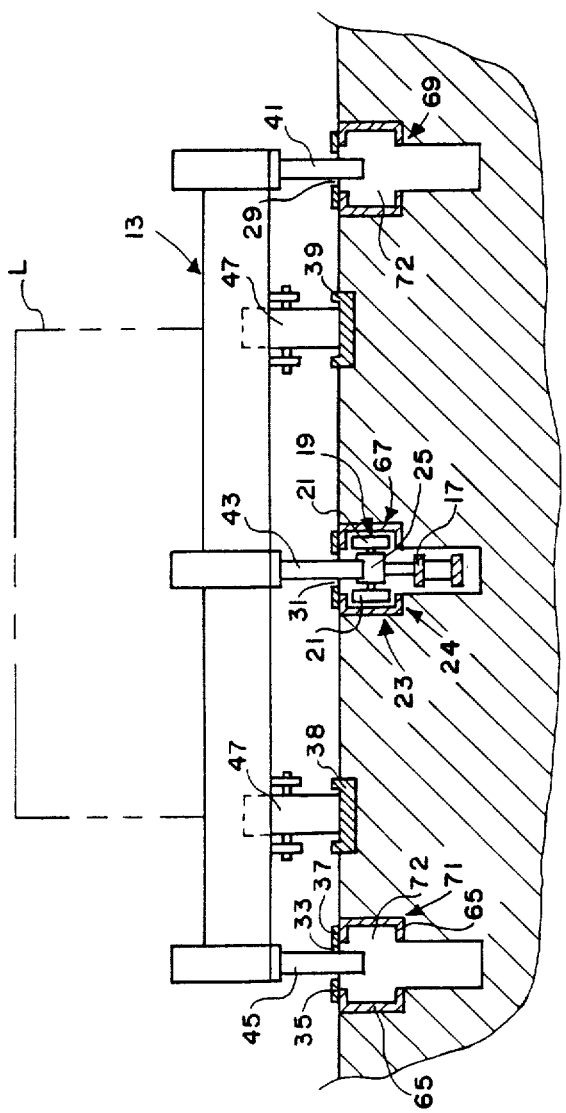

MAXIMUM DENSITY CONVEYOR SYSTEM

BACKGROUND OF THE INVENTION

1. Field of the Invention

The present invention relates in general to conveyor systems for conveying various articles.

2. Information Disclosure Statement

Heretofore, in conveying articles on a conveyor there have been various problems encountered particularly relative to the conveying of the carrier or cart, which carries the article or load, around a turn, such as a right hand or left hand turn. For example, one conveyor system for making right and left hand turns is shown in Alexander, U.S. Pat. No. 4,474,286, which has as one of its objects the maintaining of a close spacing between load carrier members while permitting the carriers to make right and left hand turns. In the apparatus disclosed in said Alexander patent the right and left hand turns are accomplished by maintaining contact between the driving members (tow pins and pusher plates) on the carriers and drive chain while the positioning of the drive chain causes the driving members to be to the inner side of the carrier member during the turn. Also, a previous conveyor system sold by the assignee of the present invention and which is prior art to the present invention utilized an arrangement in which the turns were negotiated by the pusher bar on the drive chain disengaging a tow pin on the outer side of the cart and with the path of the chain being such that the pusher bar subsequently engaged a tow pin on the inner side of the cart, i.e. moving the towing of the cart from one side to the other (outer side to inner side) to negotiate a turn.

SUMMARY OF THE INVENTION

The present invention is directed toward providing an improved conveyor system which provides greater efficiency and flexibility in operation than previous conveyor systems particularly in negotiating turns, and which provides greater towing stability.

The concept of the present invention is to switch the towing of the cart or load carrier from a normal center towing position to either side of the carrier depending upon whether the turn to be negotiated is to be a left hand or a right hand turn so that the side input or side thrust is minimized or eliminated.

One of the objects of the present invention is to provide a conveyor system in which the towing power at the center of the carrier is disengaged prior to the turn and then picked up at another point on the carrier at the inner side of the carrier, i.e., the side (right or left) towards which the carrier is to turn.

A further object is to provide means which allows a plurality of pick up points on the carrier (e.g., front-middle-back).

A further object is to provide such a conveyor system in which the towing power after the above mentioned turn is disengaged from the side of the carrier and reengaged at the center of the carrier for movement of the carrier along a straight run.

A further object is to provide positioning take up means in combination with the portion of the drive chain between the carrier disengaging point and the carrier pick up point so that the spacing of the pushers picking up the carriers going around the turn may be varied as desired.

A further object is to provide such a positioning take-up means so that chain wear and stretch over the life of the system can be easily accommodated.

A further object is to provide means allowing a staggered spacing of pusher dogs relative to the carrier for negotiating the turn thereby allowing utilization of some of the clearances available relative to the oncoming carrier in the back of the unit negotiating the turn and the carrier in front of the unit negotiating the turn.

BRIEF DESCRIPTION OF THE DRAWINGS

FIG. 1 is a diagrammatic plan view of a portion of the conveyor system of the present invention showing a left hand turn.

FIG. 2 is an enlarged sectional view taken as on the line II—II of FIG. 1 showing an end elevational view of one of the carriers of the present invention being towed from the side.

FIG. 3 is an enlarged sectional view taken as on the line III—III of FIG. 1 showing an end elevational view of one of the carriers of the present invention being towed along the center line thereof.

FIG. 4 is a diagrammatic plan view of a portion of the conveyor system of the present invention showing a right hand turn.

DESCRIPTION OF THE PREFERRED EMBODIMENT

The maximum density conveyor system 11 of the present invention includes one or more carts or carriers 13 for carrying loads such as load L or the like. Conveyor system 11 includes power means 15 for moving carriers 13 along supporting surface S. In the drawings one particular type of carrier and power means is illustrated, but it will be understood that other types of carriers and power means may be utilized without departing from the spirit and scope of the present invention.

Power means 15 is well known to those skilled in the art and preferably includes the usual power chain means 17, drive means, not shown, for moving chain means 17 lengthwise, and trolleys 19 attached to chain means 17 in spaced relationship along the chain means 17. Trolleys 19 include the usual wheels 21 for engaging chain track means 23, which forms part of the chain guide means 24, now known to those skilled in the art, to rollingly support the chain means 17. In addition, power means 15 includes pusher means 25 attached to at least some of trolleys 19 for towing carriers 13 as will be better understood in the description to follow later in the specification.

Conveyor system 11 includes carrier guide means 27 which is of suitable construction now known to those skilled in the art and preferably includes parallel tracks 29, 31, and 33, each of which is preferably formed by spaced members 35, 37. If desired carrier guide means 27 may in addition or alternatively include parallel caster tracks 38, 39, each of which is preferably in the form of channel members as seen in FIGS. 2 and 3.

Tow means 40 is provided for each of carriers 13 and for each of the carriers preferably includes the following: at least one left side tow pin 41, and if desired a plurality of alternate left side tow pins 41 shown as at 41a, 41b, 41c and 41d attached to carrier 13 in spaced relationship along the left side of carrier 13 at least at the front, middle and back of the carrier, at least one center tow pin 43 attached to carrier 13 along the center line thereof, and at least one right side tow pin 45, and if desired a plurality of alternate right side tow pins 45 shown as at 45a, 45b, 45c and 45d attached to carrier 13 in spaced relationship along the right side of carrier 13 at least at the front, middle and back of the carrier. All of the tow pins 42, 43, and 45 extend downwardly from carrier 13 with tow pins 41 extending into track 29, tow pins 43 extending into track 31, and tow pins 45 extending into track 33 to guide the carrier 13 along its path of movement. If desired, tracks 29, 31 and 33 may be omitted and carriers 13 may be guided solely by casters 47 engaging tracks 38, 39.

Each of carriers 13 are preferably provided with four casters 47 with two on each side of each carrier 13. The caster wheels 47 on the left side of the carriers 13 are suitably spaced from the caster wheels 47 on the right side of each of the carriers 13. In FIG. 1 the path of the casters 47 on the left side of carriers 13 is indicated by the diagrammatic showing as at 38 of one of the caster tracks and the path of the casters 47 on the right side of carriers 13 is indicated by the diagrammatic showing as at 39 of the other of the caster tracks, with the direction of movement of carriers 13 being shown by the arrow as at 53. For clarity, the path of travel of the carriers 13 themselves is herein designated by the numeral 55. Path of travel 55 includes at least one left turn portion 57 shown in FIG. 1, at least one right turn portion 59 shown in FIG. 4, at least one first straight portion 61, for example leading into left turn portion 57 and/or right turn portion 59, and at least one second straight portion 63 leading from left turn portion 57 and/or right turn portion 59.

Chain track means 23 are preferably respectively constructed of pairs of inwardly facing spaced channel members 65 which are below members 35, 37 and include center chain track means 67, left chain track means 69, and right chain track means 71. The spaces 72 between the channel members 65 respectively communicate with tracks 29, 31, and 33 so that tow pins 41, 43, and 45 which respectively extend downwardly between members 35, 37 of tracks 29, 31, and 33 are in position to be engaged by pusher means 25 during certain portions of the path of travel 55.

Thus, on the portion 73 of first straight portion 61 and on the portion 75 of the second straight portion 63 of the path of travel 55, chain track means 23 guides chain means 17 adjacent center track 31 so as to position pusher means 25 to engage respectively center tow pin 43 of each of the carriers 13 which are on portions 73, 75. See FIG. 3, which shows chain means 17 riding on center chain track means 67 and the engagement of one of the pusher means 25 with center tow pin 43 to tow a carrier 13 in a normal center towing condition, i.e. being towed substantially along the center line thereof, during the movement of the carrier along portion 73 of first straight portion 61 and along portion 75 of second straight portion 63.

Prior to a left turn portion 57 or a right turn portion 59 chain means 17 is caused to veer away from center chain track means 67 in a manner now known to those skilled in the art by chain guide means, not shown, to guide chain means 17 away from center tow pin 43 at a first disengaging point 77, as for example by a quick drop of the chain means 17 downwardly away from center chain track means 67. This releases towing power from the carrier 13 to provide a power released carrier illustrated as at 13a (see FIG. 4). Then, from disengaging point 77 chain means 17 is disposed in an S-configuration as at 79, by chain guide means, not shown, now known to those skilled in the art, towards the left for a left turn (see FIG. 1) or towards the right for a right turn (see FIG. 4). S-configuration 79 includes a forward U-turn 81 leading to a straight portion 83 extending in the opposite direction from the direction of movement 53 of carriers 13, and finally a rearward U-turn 85 veering towards left chain track means 69 for a left turn (see FIG. 1) and towards right chain track means 71 for a right turn (see FIG. 4). This is done in a manner now known to those skilled in the art, as for example by a quick rise of the chain means 17 towards chain track means 69 or 71, to guide chain means 17 towards tow pins 41 for a left turn and towards tow pins 45 for a right turn at a first pick-up point 87 where pusher means 25 can engage tow pins 41 or 45 depending upon whether the turn is a left or right turn to provide a power engaged carrier 13b (see FIG. 1) and move the carrier around turn portions 57 or 59.

Subsequent to the right or left turn, but preferably prior to second straight portion 75 is a second S-configuration 89 similar in function and construction to S-configuration 79. Also, the related portions of S-configuration 89 are similar to the related portions of S-configuration 79. Thus, S-configuration 89 has in conjunction with it a second disengaging point 91 similar to first disengaging point 77, and has a second pick-up point 93 similar to first pick-up point 87. However, it will be understood that the second disengaging point 91 is adjacent the inside track 29 or 33 depending on the direction of turn instead of being adjacent to the center track 31, and the second pick-up point 93 is adjacent center track 31 instead of being adjacent inside track 29 or 33.

In S-configuration 79 there is preferably provided positioning take-up means 95 which is between first disengaging point 77 and first pick-up point 87 for varying the pick-up position of pusher means 25 relative to tow means 40. The positioning take-up means 95 and the guidance of the chain means 17 in the S-configuration 79 is now known to those skilled in the art, and positioning take-up means 95 functions to move the position of the rearward U-turn 85 forwardly or rearwardly relative to first pick-up point 87, as for example rearwardly to the position shown as at 85, in the manner of a conventional take-up mechanism for taking up slack in a chain.

In the operation of the present invention it will be understood that each carrier 13 will be moved along supporting surface S by power means 15. Normally, when moving along a straight stretch of the path of travel 55, carriers 13 are towed in a normal center towing position, and then just prior to a turn the towing of the carrier is switched from the normal center towing position to a towing position to one side or the other of the carrier depending upon whether the turn to be negotiated is to be a left hand or a right hand turn. Thus, the side input or side thrust is minimized or eliminated that would otherwise occur, for example, if the carriers were normally towed from one side and then the towing switched to the opposite side prior to a turn.

It will be understood that in the operation of the system 11 of the present invention, the above mentioned switching of the towing position from a center towing position to one of the side towing positions is preferably accomplished by the S-configuration 79 of chain means 17 to provide the released carrier shown as at 13a which will remain stationary in this position until a pusher means 25 engages one of the tow pins 41 for a left hand turn or one of tow pins 45 for a right hand turn whereupon the carrier at position 13a will become a power engaged carrier and be moved around the turn. Then, it will be understood that after making the turn the towing position will be switched back from a side towing position to a center towing position for the next straight stretch of the path of travel 55. This last mentioned switching is preferably accomplished by the S-configuration 89 whereupon the carrier is first released from being powered by chain means 17 to provide the released carrier shown as at 13c (see FIG. 1) which remains stationary in this position until a pusher means 25 engages tow pin 43 and moves the carrier along the straight stretch of travel by center line towing until the next turn.

Also, it will be understood that in the operation of the system 11, positioning take-up means 95 allows the spacing between adjacent carriers 13 to be varied. Thus, for example, if the rearward U-turn 85 is moved rearwardly from the position shown as at 85 in FIGS. 1 and 4 to the position shown as at 85 there will be a greater delay in the pick up of the released carrier at 13a and therefore the spacing between the carriers at 13b and 13c will be increased. Similarly, if the rearward U-turn 85 is moved forwardly there will be a shorter delay in the pick-up of the carrier and therefore the spacing will be decreased. In addition, positioning take-up means 95 may be utilized to compensate for chain wear and stretch over the life of the system. If desired a positioning take-up means, now shown, of similar construction and function to positioning take-up means 95, may be provided at the second S-configuration 89.

Additionally, it will be understood that the disengagement of the pusher means 25 from the tow means 40 permits ducking the chain means 17 underneath the caster tracks 38, 39 (when desired) and pick up on an outboard portion of the carriers 13 without having to move the pusher means 25 across the caster tracks 38, 39 which would require a slot in the tracks 38, 39 for clearance of the pusher means 25 and leave a gap for the caster wheels 47 to pass over.

Although the present invention has been described and illustrated with respect to a preferred embodiment thereof and a preferred use therefor, it is not to be so limited since changes and modifications can be made therein which are within the full intended scope of the invention.

I claim:

1. A conveyor system comprising in combination:
   (a) at least one carrier;
   (b) carrier guide means for guiding said carrier along a path of travel that includes at least one turn portion and at least one straight portion leading into said turn portion;
   (c) power means for moving said carrier including power chain means and a plurality of pusher means attached to said chain means;
   (d) tow means including at least one center tow means attached to said carrier substantially on the center line of said carrier, and at least one side tow means attached to said carrier on one side of said carrier; and
   (e) chain guide means for guiding said chain means along at least a portion of said straight portion with at least one of said pusher means being positioned to engage said center tow means to tow said carrier along a normal center towing position during the movement of said carrier along said portion of said straight portion, for guiding said chain means away from said center tow means at a first disengaging point to disengage said one of said pusher means from said center tow means and release towing power from said carrier, and for subsequently guiding said chain means to a first pick up point to engage one of said pusher means with said side tow means and move said carrier around said turn portion.

2. The conveyor system of claim 1 which includes positioning take-up means operably coupled to said chain means between said first disengaging point and said first pick up point for varying the pick up position of said pusher means relative to said side tow means.

3. The conveyor system of claim 1 in which said side tow means includes at least one side tow pin located adjacent the front of said carrier, a side tow pin located adjacent the middle of said carrier, and a side tow pin located adjacent the back of said carrier.

4. A conveyor system comprising in combination:
   (a) a plurality of carriers;
   (b) carrier guide means for guiding said carriers along a path of travel that includes at least one left turn portion, at least one right turn portion, a first straight portion leading into one of said turn portions, and a second straight portion leading from said one of said turn portions;
   (c) power means for moving said carriers including power chain means and a plurality of pusher means attached to said chain means;
   (d) tow means for each of said carriers including at least one center tow means attached to each of said carriers substantially on the center line thereof, at least one left side tow means attached to each of said carriers on the left side of each of said carriers; and at least one right side tow means attached to each of said carriers on the right side of each of said carriers;
   (e) chain track means for guiding said chain means along at least a portion of said first straight portion with said pusher means being positioned to engage respectively said center tow means of each of said carriers to tow said carriers along a normal center towing position during the movement of said carriers along said portion of said first straight portion, for guiding said chain means away from said center tow means to a first disengaging point to disengage said pusher means from said center tow means and release towing power from said carrier at said first disengaging point to provide a power released carrier, and for subsequently guiding said chain means to a first pick up point to engage one of said pusher means with said side tow means of said released carrier to provide a power engaged carrier and to move said power engaged carrier around one of said turn portions.

5. The conveyor system of claim 4 in which said chain guide means includes means adjacent said second straight portion for guiding said chain means away from said side tow means of said power engaged carrier at a second disengaging point to disengage said one of said pusher means from said side tow means to provide a power released carrier, and for subsequently guiding said chain means to a second pick up point to engage one of said pusher means with said center tow means to provide a power engaged carrier and to move said power engaged carrier along said second straight portion.

6. The conveyor system of claim 5 which includes positioning take-up means operably coupled to said chain between said first disengaging point and said first pick-up point for varying the pick-up position of said pusher means relative to said side tow means.

7. The conveyor system of claim 6 in which said side tow means includes at least a side tow pin located adjacent the front of said carrier, a side tow pin located adjacent the middle of said carrier, and a side tow pin located adjacent the back of said carrier.

8. The conveyor system of claim 7 in which said carrier includes wheels for movably supporting said carrier from a supporting surface.

* * * * *